United States Patent [19]
Weidstam

[11] 3,953,851
[45] Apr. 27, 1976

[54] DEVICE FOR A RADIO STATION COMPRISING A JAMMER

[76] Inventor: Eskil Weidstam, Banergatan 55, Stockholm, Sweden

[22] Filed: Mar. 17, 1970

[21] Appl. No.: 24,912

Related U.S. Application Data

[63] Continuation-in-part of Ser. No. 690,709, Dec. 8, 1967, abandoned.

[52] U.S. Cl. ............................................. 343/18 E
[51] Int. Cl.² ...................... G01S 7/38; H04K 3/00
[58] Field of Search ........................... 343/14, 18 E

[56] References Cited
UNITED STATES PATENTS

| | | | |
|---|---|---|---|
| 2,965,896 | 12/1960 | Wright et al. | 343/14 |
| 3,109,172 | 10/1963 | Hardinger et al. | 343/14 |
| 3,195,130 | 7/1965 | Adrian | 343/18 E |

*Primary Examiner*—Malcolm F. Hubler
*Attorney, Agent, or Firm*—Robert E. Burns; Emmanuel J. Lobato; Bruce L. Adams

[57] ABSTRACT

A jammer comprises a frequency modulated transmitter for jamming, a receiver and a mixer for the receiver. One input of the mixer is connected to a receiver antenna circuit and a record input is connected to the output of the transmitter, the carrier of which is frequency modulated according to an arbitrary function of time. The receiver is tuned to receive a frequency including side bands which lie within one range of beat frequencies produced by the mixer, varying in dependence on the transmitter modulation wave. An indicating device indicates the presence of output signals of the receiver unit in dependence on the carrier frequencies received which lie within approximately the range of frequencies transmitted by the transmitter.

2 Claims, 10 Drawing Figures

$T_1 \neq T_2 \neq T_3 \neq T_1$

DEVICE FOR A RADIO STATION COMPRISING A JAMMER

This application is a continuation-in-part of my application Ser. No. 690,709 filed Dec. 8, 1967, now abandoned.

This invention relates to an arrangement at frequency modulated radio stations including a transmitting unit for jamming.

When using some radio transmitters there is need for a simultaneous listening to other transmitters operating on the same frequency band as the own transmitter. That is the case with jammers because one wants to determine if the radio signals that the jamming is concentrated on really remain on the frequency they had before the jamming started.

A jammer is often used in a craft, such as a vessel or an aircraft, with the object of making it difficult or impossible for the enemy to detect and track the craft by radar means. In such an application the jammer ought to transmit when the craft is illuminated by a hostile radar beam. One should, however, avoid transmission earlier. One reason for this is the importance of not causing unwanted interferene e.g. with friendly radars. Another reason is that the onset of jamming before the craft has entered the area, defined by maximum enemy radar range, may alert the enemy and give him more time to take defensive action and apply e.g., counter-counter-measures.

In order to enable the member of the crew in charge of jamming to determine when to start transmission, it is customary to equip the craft with a receiver that can pick up incident radar signals. A so called straight receiver can yield information about the presence of any radar operating within the frequency band, covered by the receiver. By auditive or visible presentation means the receiver can also yield information about the search pattern and the pulse recurrence frequency of the radar. Such a simple receiver is known as a radar warning receiver.

In addition to the above mentioned information the jammer operator may need to know the carrier frequency of incident radar signals. Such information would enable him to concentrate available jamming power to a narrow band, just sufficiently large to cover present enemy signals. This would be what is called spot jamming, which is more effective than wide band jamming.

After having determined the frequency band to jam and having started transmission, the jammer operator using a known receiving device must renounce from continued reception. Means that reduces the sensitivity of the receiver to prevent the transmitted jamming signal from overloading or injuring the receiver during the time in which the jamming transmitter is actively transmitting is commonly used. The method excludes reception.

However, during the time when jamming signals are transmitted, there is a need to receive enemy radar signals and thus to get information about measures taken by the enemy, such as directing height-finding or tracking radars towards the craft. The enemy may also tune his radar to another frequency and thus escape the jamming. Continued survey of the signals from the enemy through the jamming is therefore most important.

One has been aware of this consideration and has proposed turning off transmission automatically after an interval so that reception can recommence. This method of survey is dangerous, however, in that it leaves enemy radars unjammed for some time and thus gives the enemy a chance to position and track the craft. Even if he cannot do so continuously, dead reckoning may enable him to keep track of the craft also in the jammed intervals.

A jammer operator using some receiving device according to the art prior to my invention thus finds himself in a dilemma. On one hand he may continue to jam on a once selected frequency band without knowing what the enemy does. On the other hand he may now and then interrupt the jamming, meant for his protection, in order to find out what the enemy does. Both ways may be fatal.

My device overcomes this dilemma in that it allows reception completely unobstructed by jamming signals, transmitted simultaneously.

What has now been said about radar does also hold true for all other kinds of radio transmission.

The device according to my invention thus is a solution to the problem of accomplishing continuous surveillance of the radio signals that the jammer is intended to disturb in order to determine if the frequency of said signals remains on the same value it had when the transmitting started.

The invention will be described in connection with the accompanying drawings in which FIGS. 1 and 2 are block diagrams of embodiments of the invention.

Figure 1:
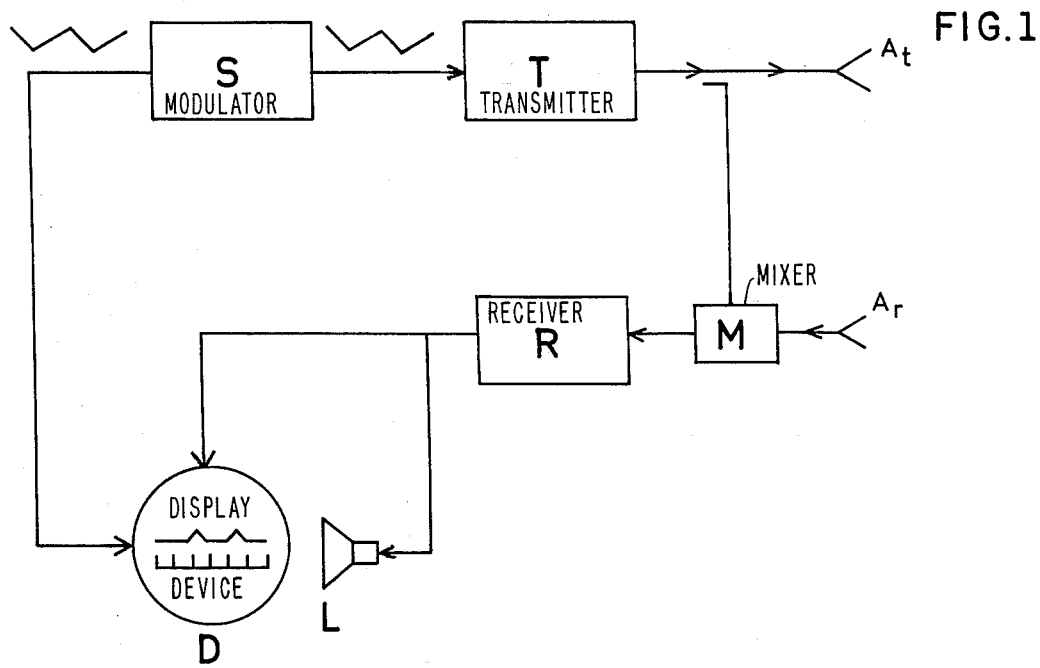

The device in FIG. 1 consists of a modulator S, a transmitter T, an antenna for transmission $A_t$, another antenna for reception $A_r$, a mixer M, a receiver R, a display means D and an electroacoustic device L. The modulator S is connected to the transmitter T and to the display means D. The transmitter is directly connected to its antenna $A_t$. The receiver antenna $A_r$ is connected to the mixer M which is also connected to the output of the transmitter through a loose coupling e.g., a directional coupler. The output of the mixer is connected to the input terminal of the receiver R. The output terminal of the receiver is connected to the display means and to the electroacoustic device.

The modulator S is arranged to frequency modulate the signal generated within the transmitter T. The oscillating element of the transmitter may be a backward wave oscillator tube or a voltage tunable magnetron. The modulating voltage applied to the transmitter varies periodically between two limits according to an arbitrary function of time. The frequency $(f_t)$ of the transmitted signal will in turn vary periodically between two frequency limits according to a function of time which is a copy of the modulating waveform.

While the main portion or the output power delivered by the transmitter is radiated by the antenna $A_t$ a small fraction of this power enters the mixer. A signal which simultaneously arrives at the receiving antenna from some external source and passes on to the mixer will beat the signal from the transmitter and give rise to signals at sum and difference frequencies.

The receiver is arranged to amplify signals within a narrow band around a frequency here referred to as the intermediate frequency ($f_i$). Output signals from the mixer which fall within the passband of the receiver will after amplification appear in visual form on the display means or in audible form in the electroacoustic device L or in both forms.

The device L which may be a loudspeaker or a couple of telephone receivers will alert a standby operator of the presence of received signals and will subsequently yield audible information about them.

The display means D is arranged to indicate received signals as a function of frequency in a panoramic representation. It may consist of a cathode ray oscilloscope the x-deflection of which is controlled by the modulating voltage. The signals from the receiver may either intensity-modulate the electron beam or cause it to be deflected in the y-direction or both.

Figure 2:
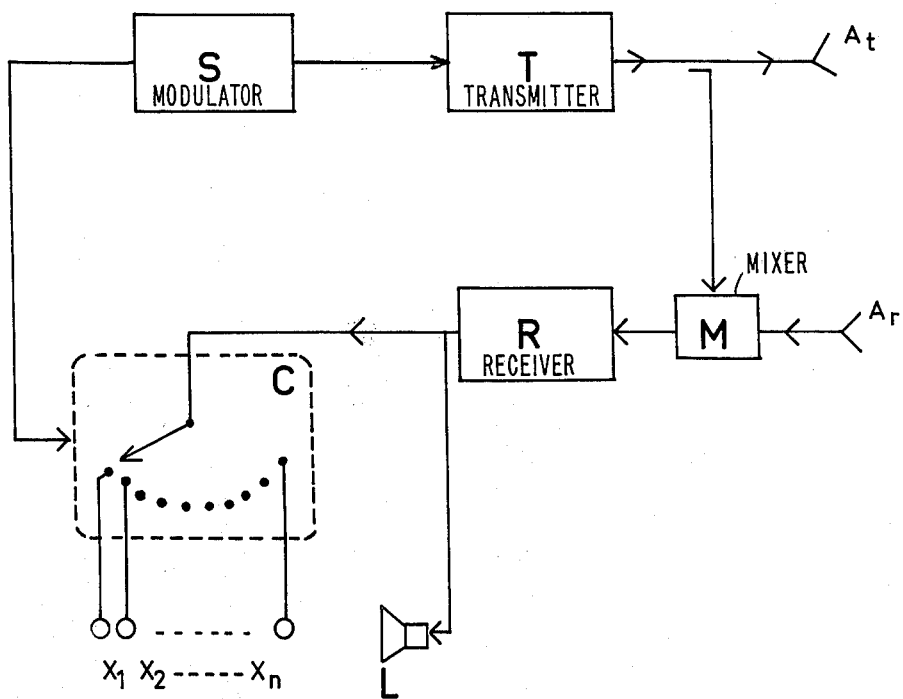

FIG. 2 shows an alternative arrangement of the display. It consists of an array of lamps or similar devices $X_1, X_2 \ldots X_n$ and a commutator C for the commutation of individual lamps in a sequence controlled by the modulating voltage. In practice the commutator may consist of an electronic counting device.

A more detailed description of how the devices operate will now be given in connection with the frequency-time diagram in FIG. 3. Numerical values given in the drawing are to be regarded as examples only.

The transmitter is arranged to transmit a signal with frequency $f_t$ varying across a certain band according to an arbitrary function of time. When this signal leaves the antenna of the transmitter a small fraction of it simultaneously enters the mixer. Signals $f_r$ which simultaneously arrive at the receiving antenna and pass on to the mixer are accordingly transposed there to the frequency $f_r + f_t$ and the frequency $|f_r - f_t|$. But as the receiver can only amplify signals of frequency $f_i$ it is possible to estimate the frequency of the signal $f_r$ of the superheterodyne system thus described from the equation $$(I) \quad |f_r \pm f_t| = f_i \quad \text{or} \quad f_r = |f_t \pm f_i| \quad (II)$$

This equation shows that if $f_t$ increases from the value $(f_t)_{min}$ to the value $(f_t)_{max}$ and if $f_i < (f_t)_{min}$ (see FIG. 2) reception will occur at least once for each frequency within the interval $$(f_t)_{min} - f_i < f_r < (f_t)_{max} + f_i.$$

Figure 3:
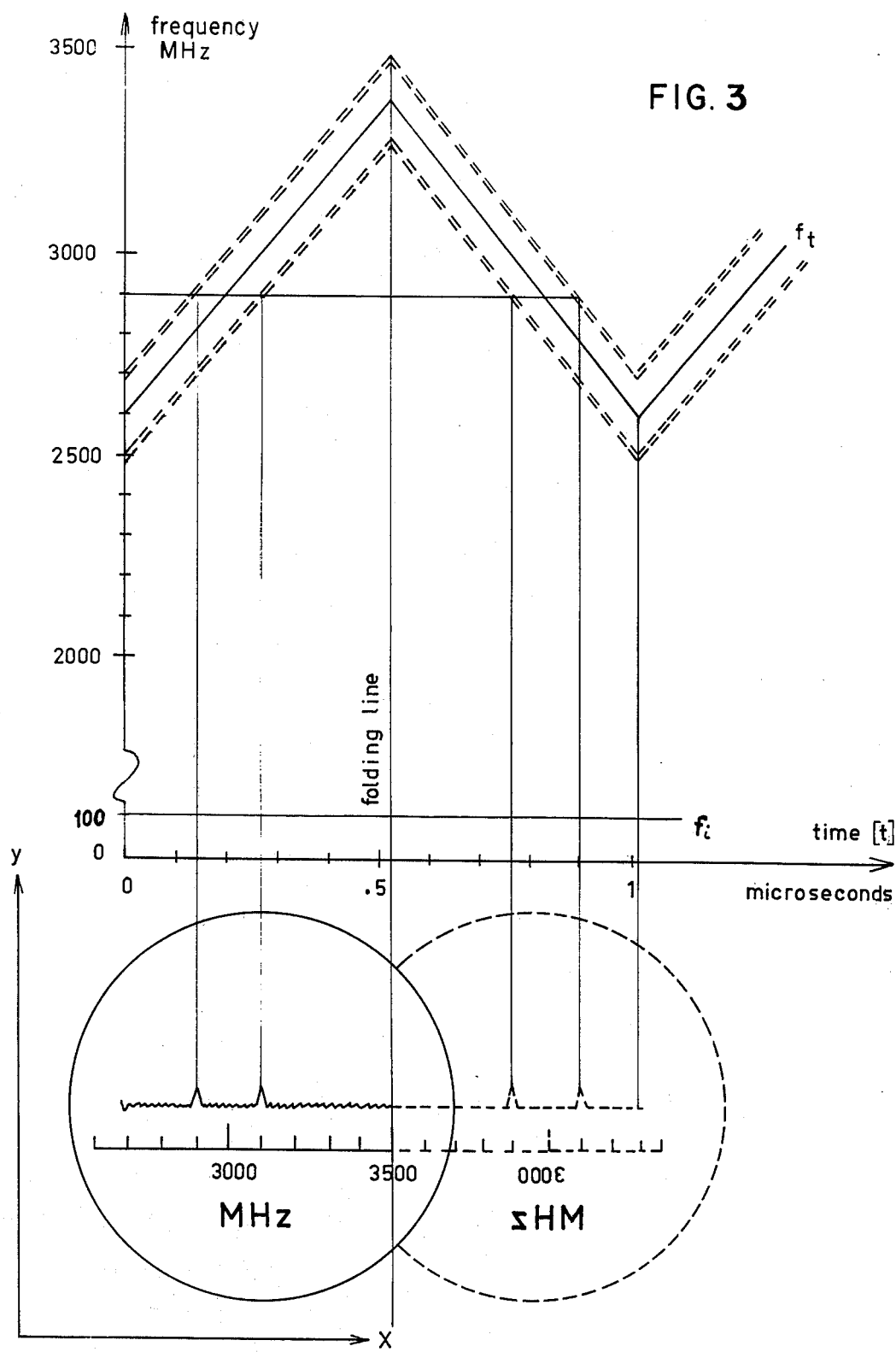
FIG. 3 is a frequency-time diagram.

A solid line indicates how the transmitter frequency $f_t$ varies with time in FIG. 3 which also shows a graphical representation of $f_r$ in accordance with the above equation in its form (II). It is assumed that the receiver R has a passband centered at 100 megaherz and a bandwidth of 20 megaherz. As there is no preselection any signal with a frequency differing by 100 megaherz from $f_t$ will give rise to a beat signal which can be amplified by the receiver. Since $f_t$ varies all the time the frequencies at which reception can take place will likewise vary as indicated by the dotted bands above and below the solid line for $f_t$. These bands are shown both 20 megaherz wide.

It is further assumed that a signal on 2900 megaherz is picked up by antenna $A_r$. At approximately $t=0,1$ microseconds this signal will fall within the upper receiving band and give rise to a short pulse to the display means. Below the time scale is a picture of an oscilloscope screen used as a frequency panorama as the device D in FIG. 1. Deflection in the X direction is controlled by the modulating voltage and in the y direction by the receiver output. So the short pulse causes a spike in the electron beam trace at 2900 on a frequency scale drawn under the trace. At approximately $t=0,3$ microseconds the lower receiving band passes 2900 megaherz and also cuts out a short pulse from the incident signal which causes a second spike to appear on the oscilloscope, at a certain distance to the right of the first one.

When $f_t$ has reached its upper limit and has turned to fall, the spot on the oscilloscope screen will return in its own path and draw spikes in the same places as before when each receiving band in turn cuts across 2900 megaherz. In the figure these cuts are projected down to a dotted picture of the oscilloscope drawn as if seen in a mirror. It is readily understood that if one folds the dotted screen over on top of the solid one using the "folding line " as an axis the two traces with their spikes will coincide.

Figure 4:
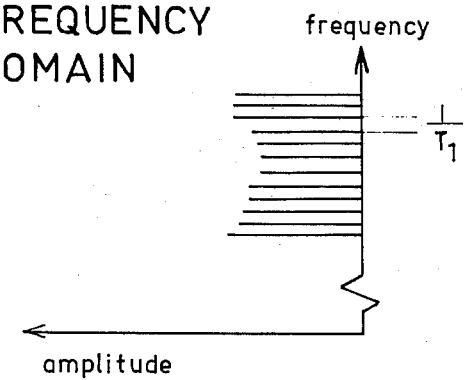
FIGS. 4 and 5 are diagrams illustrating the relationships between frequency and time domains for certain functions.
Figure 4:
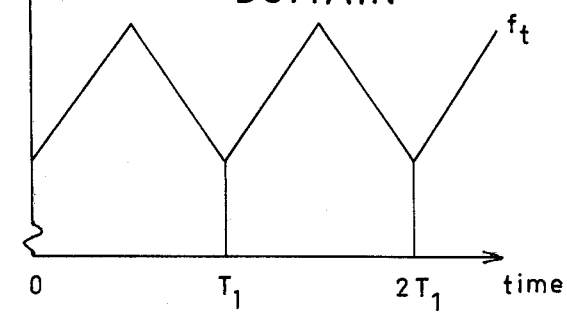

The frequency $f_t$ sweeps between two extremes. If all periods were of the same duration, $T_1$ microseconds, the resultant jamming signal spectrum would consist of a number of discrete frequency components spaced in frequency by $1/T_1$ megacycles, as shown in FIG. 4. But a jamming signal of this type has the disadvantage that no power is present in the gaps between spectral lines so that a radar by operating in such a gap can escape the jamming.

Figure 5:
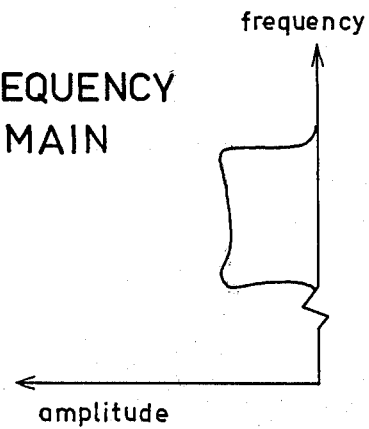
Figure 5:
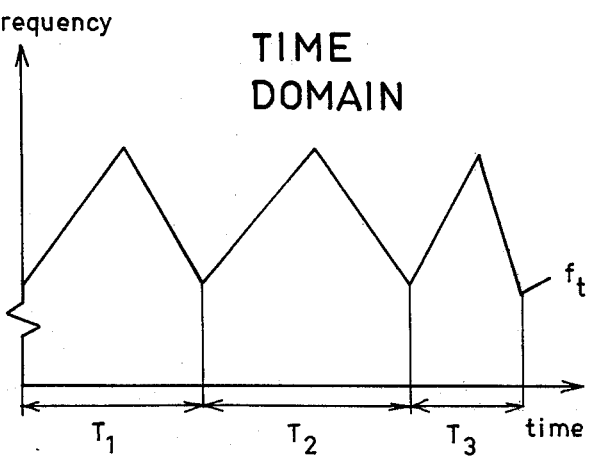

It is therefore preferable to make the frequency variation somewhat irregular. This can be done by jittering the repetition rate of the modulating waveform so that the duration of the period will vary in a more or less stochastic manner. By doing so one avoids the concentration of power to discrete spectral lines. Instead the series of aperiodic frequency sweeps when Fourier transformed to the frequency domain will yield a continuous spectrum as shown in FIG. 5. Another method which can be applied alone or in combination with the first one is to let the frequency limits vary from one sweep to another. One can also let the frequency variation have other irregularities such as nonlinear rise and fall and unequal rise and fall times all in order to improve the jamming effect of the swept signal and make it approach that of pure noise.

FIG. 1 illustrates a case where $f_t$ is a symmetric function with straight branches. It is, however, obvious that the device will work in the same general manner also when $f_t$ is an asymmetric or nonlinear function of time.

It has been shown that the information obtained on the oscilloscope is reduntant already after 1 microsecond. Since transmissions from pulsed radar stations seldom are of a shorter duration but frequently last several microseconds it is possible to suppress indication on the panorama on either the forward going or the return trace without reducing the probability of intercepting even very brief pulse radar transmissions.

A pair of spikes on the frequency panorama indicates the presence of one intercepted signal and with the frequency scale drawn as in FIG. 3 the left hand spike indicates frequency. When two pairs of spikes appear simultaneously one will know that two signals are being intercepted. As the distance between spikes in a pair is always the same it is easy to conclude which spikes out of the four that indicate frequency. For higher numbers of intercepted signals it becomes increasingly difficult to sort out the spikes which correspond to the frequencies of the intercepted signals.

Figure 6:
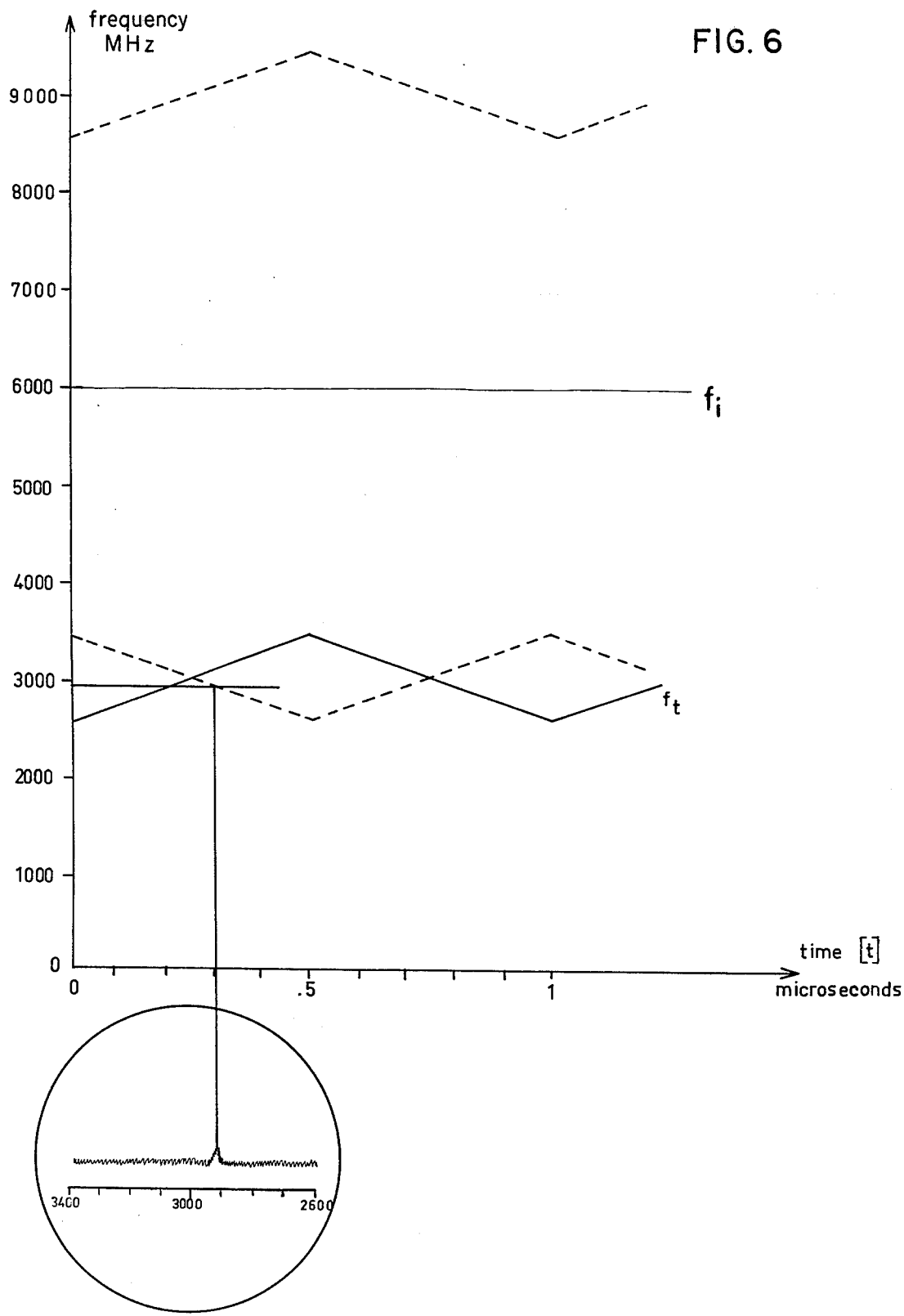
FIG. 6 is a further frequency-time diagram.

The embodiment of the invention illustrated by FIG. 6 overcomes this difficulty. This embodiment is similar to the previous one in all respects except that the pass band of the receiver R is situated at a considerably higher frequency. In FIG. 6 it is assumed to be centered at 6000 megaherz with the same bandwidth of 20 megaherz as in the previous embodiment. The resulting receiving bands are indicated by dotted lines. One is at very high frequencies and can therefore be suppressed by a low pass filter between antenna $A_r$ and mixer M.

The other receiving band in this case covers the same range of frequencies as the transmitter but this range is swept through in a direction opposite to that of $f_t$. So when $f_t$ starts from its lower limit and rises, this receiving band starts from its upper limit and falls. If we again assume an incident signal at 2900 megaherz this will be cut through by the receiving band a certain time after the frequency sweep has started. As explained before a pulse will result and appear as a spike on the oscilloscope trace. Only one spike appears for each incident signal so no ambiguity can arise.

Also in this case sufficient probability of interception is obtained if signals are indicated either during rise time or fall time. But it is possible to display all available information.

Figure 7:
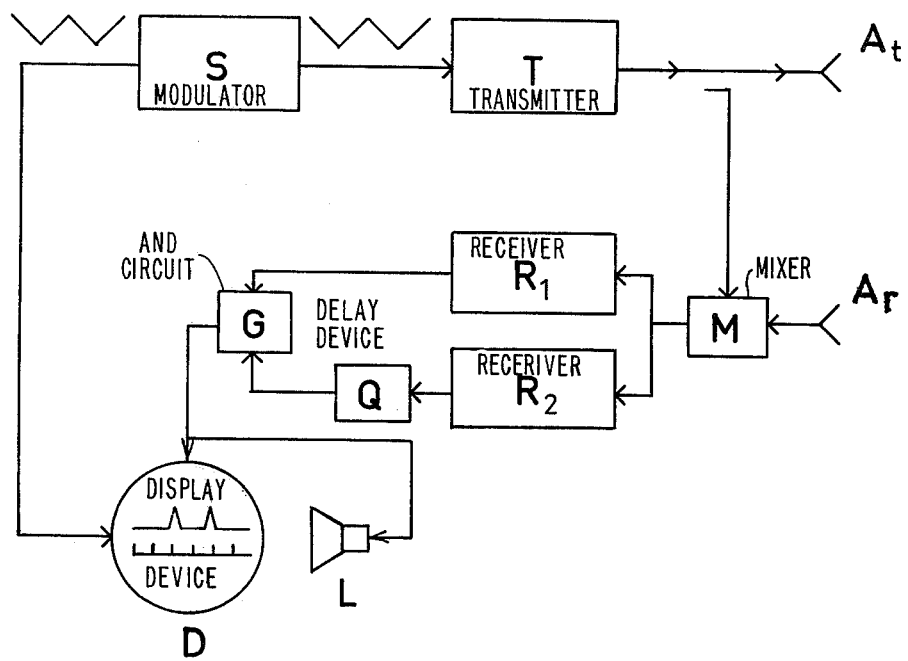
FIG. 7 is a block diagram of a further embodiment of the invention.

FIG. 7 shows an embodiment of the invention where a different method, previously known per se, is used for obtaining a single-spike presentation of each intercepted signal. The device in FIG. 7 consists of a modulator S, a transmitter T, an antenna $A_t$ for transmission, another antenna for reception $A_r$, two receivers $R_1$ and $R_2$, a delay device Q, and AND circuit G a display means D and an electroacoustic device L.

The modulator is connected to the transmitter and to the display means. The transmitter is directly connected to its antenna $A_t$. The antenna for reception $A_r$ is connected to the mixer which is also connected to the output of the transmitter through a loose coupling e.g., a directional coupler. The output of the mixer is connected to the inputs of both receivers. The output terminal of the receiver $R_1$ is connected to the AND circuit G. The output terminal of the receiver $R_2$ is connected to the delay device, the output of which is also connected to the AND circuit. The output of the AND circuit is connected to the display means and to the electroacoustic device.

The device according to FIG. 7 has much in common with the one according to FIG. 1 and operates in the same way as the latter except as regards the receivers, the delay device, and the AND circuit. The following description of how the device operates will therefore only deal with these parts and will do so in connection with FIG. 8. Numerical values are to be regarded as examples.

The receiver $R_1$ is assumed to have a 20 megaherz wide passband centered at 100 megaherz and the receiver $R_2$ to have an equally wide passband centered at 200 megaherz. The frequencies at which reception of incident signals can take place as $f_t$ sweeps back and forth are indicated by two pairs of dotted lines on either side of the solid line representing $f_t$.

Assume as before that a signal on 2900 megaherz is picked up by the antenna $A_r$. Shortly before $t=0.1$ microsecond the upper receiving band designated ($R_2$) will pass the 2900 megaherz level and give rise to a short pulse out to the delay device. An instant later the upper receiving band designated ($R_1$) will in the same way give rise to a short pulse out of the receiver $R_1$. Meanwhile the first pulse has passed through the delay device and arrives at the AND circuit at the same time as the second pulse, because the time delay of the device Q is chosen to be equal to the time that elapses between the generation of individual pulses in a pair.

The AND circuit has the property that it delivers an output pulse only when pulses arrive simultaneously at each of its two input terminals. This now being the case the circuit delivers a pulse to the display means where it appears as a spike above the mark corresponding to 2900 megaherz on a frequency scale.

Figure 8:
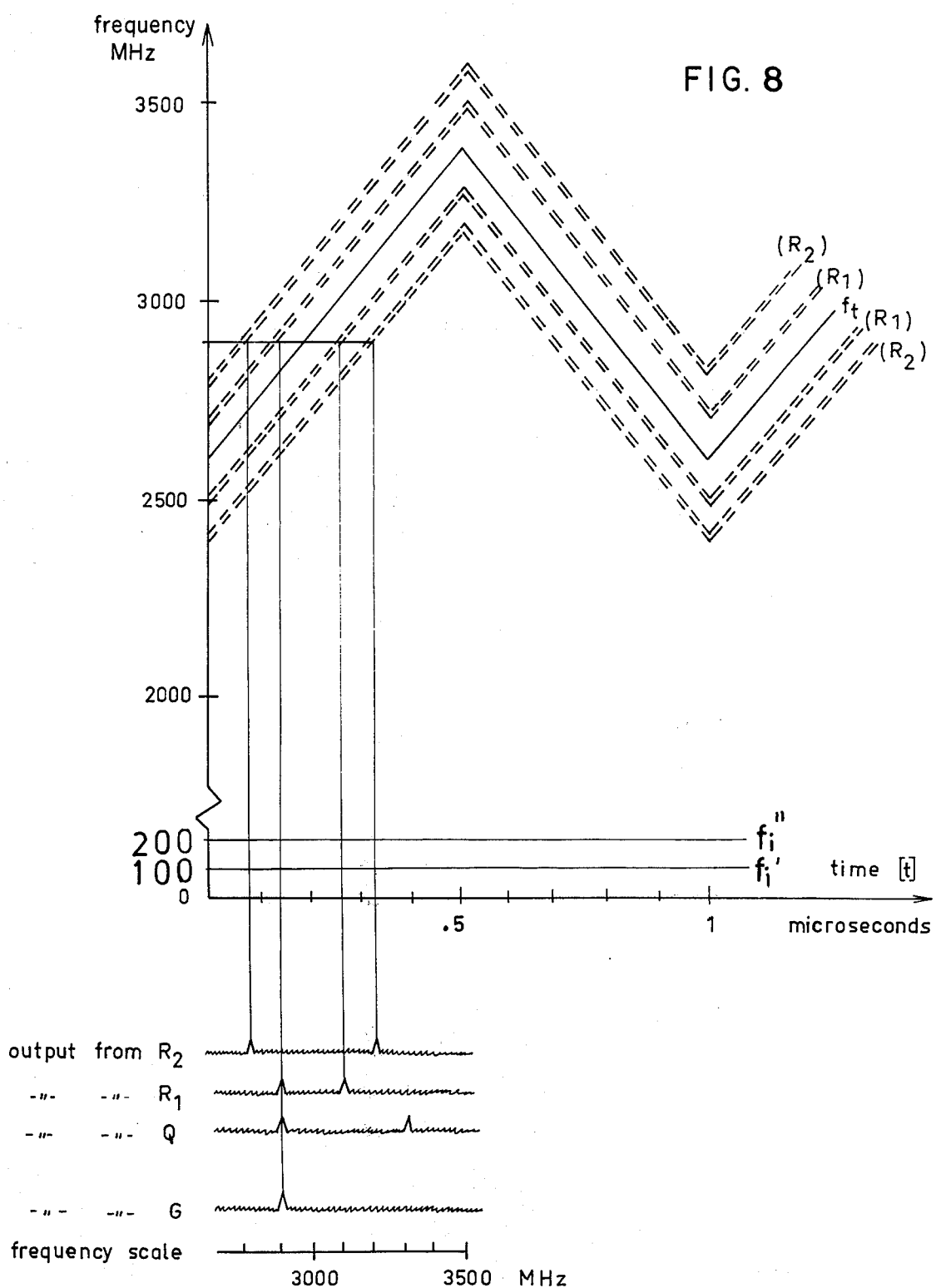
FIG. 8 is a frequency-time diagram relating to the embodiment of FIG. 7.

At about $t=0.3$ microseconds the 2900 megaherz level will be intersected first by the lower receiving band designated ($R_1$) and then by the one designated ($R_2$), whereby the pulses shown in FIG. 8 are generated. The pulse out of the receiver $R_2$ is lagging behind the other and after its passage through the delay device it is even more lagging. So no coincidence occurs at the AND circuit and therefore the pair of pulses will cause no output to the display means.

The embodiment of the invention according to FIG. 7 derives information from intercepted signals only when $f_t$ sweeps in one direction. The description given above in connection with FIG. 8 shows how information is derived while $f_t$ is rising. In this case the modulator is arranged to provide a voltage for blanking the oscilloscope presentation when $f_t$ is falling. If desirable one can instead blank presentation when $f_t$ is rising and derive information when $f_t$ is falling. In such a case one has to let the two receivers in FIG. 7 change places.

The embodiment of the invention as described in connection with FIGS. 7 and 8 is capable of receiving signals within a band which is displaced somewhat towards higher frequencies as compared with the band swept by the transmitter. In order to be able to cover with reception the entire band over which jamming takes place one can use the embodiment of my invention shown in FIG. 9.

Figure 9:
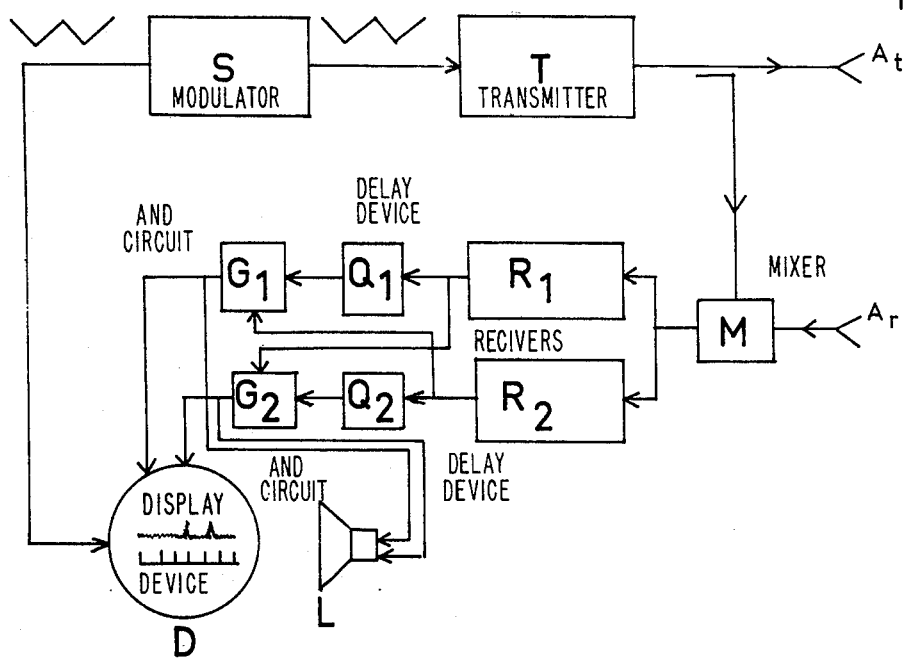
FIG. 9 is a block diagram of a still further embodiment.

The device according to FIG. 9 corresponds to that of FIG. 7 except that the output of the receiver $R_1$ is connected to a delay device $Q_1$ which in turn is connected to an AND circuit which feeds the display means as well as the electroacoustic device L. The output of the receiver $R_2$ is in a similar way connected to a delay device $Q_2$ and an AND circuit $G_2$ which feeds the display device D and the electroacoustic device L. For control purposes the output of the receiver $R_1$ is connected to the AND circuit $G_2$ and the output of the receiver $R_2$ is connected to the AND circuit $G_1$.

It is readily seen that all the blocks except $Q_1$ and $G_1$ have their counterparts in FIG. 7. From the description given in connection with FIG. 7 and from symmetry it is obvious that the output from block $G_2$ yields information pertaining to the upper receiving bands in FIG. 8 and that the output from block $G_1$ yields information pertaining to the lower receiving bands in the same FIG. All information is conveyed to the display means and to the electroacoustic device.

Figure 10:
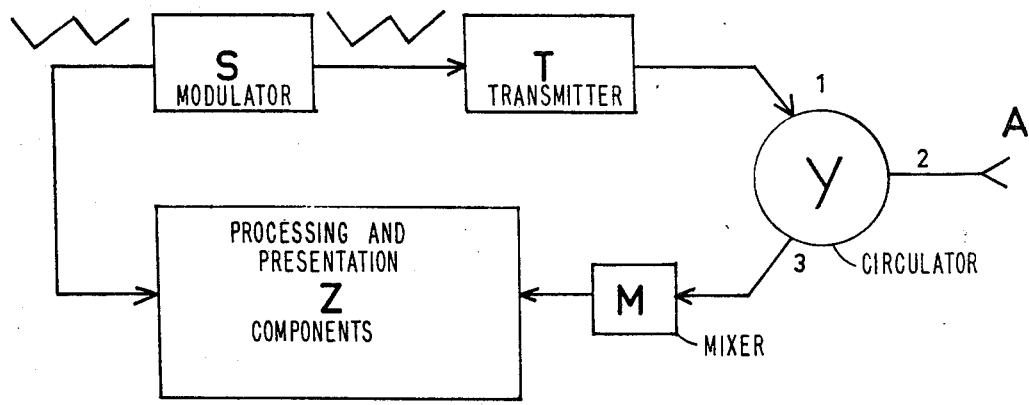
FIG. 10 is an additional embodiment.

FIG. 10 shows an embodiment of the invention which receives and transmits with the same antenna. It consists of a modulator S, a transmitter T, a circulator Y with three ports, an antenna A, a mixer M and a block Z, which embraces all components for amplification, other processing and presentation of received signals, no matter which of the previously described arrangements is used for these purposes.

The modulator is connected to the transmitter and to the block Z. The transmitter is connected to port 1 of the circulator Y which has the property of transferring the main part of the jamming power to port 2 from where it is coupled to the antenna. Signals received by the antenna enter port 2 of the circulator Y which also has the property of transferring these signals to its port 3 from where they are coupled to the mixer. The circulator Y finally transfers a small portion of the jamming power from port 1 to port 3, where it is fed into the mixer.

What I claim is:

1. An arrangement at a radio station including a frequency modulated transmitter unit for jamming, a receiver unit for the reception of externally generated signals and a mixer preceding the receiver unit, the one input of the mixer being connected to a receiver antenna circuit and the second input to the output circuit of the transmitter unit, the carrier of which is frequency modulated according to an arbitrary function of time, said receiver unit is tuned to receive a frequency including side bands which lies within one range of beat frequencies produced by the mixer, varying in dependence of the transmitter unit modulation wave, an indicating device indicating the presence of output signals of the receiver unit in dependence of carrier frequencies received which lie within essentially the range of frequencies transmitted by the transmitter unit, said receiver unit including two receivers tuned to different frequencies the inputs of the receivers are fed by the mixer in parallel the output of the one receiver is connected to the one input of an AND circuit the output of which is connected to the display device or electroacoustic device, and the output of the second receiver is connected to second input of the AND circuit via a time delay circuit which provides a time delay equal to the time interval between two successive output pulses delivered in turn by the two receivers in dependence of one received signal, the AND circuit being such that it passes coinciding pulses.

2. An arrangement at a radio station including a frequency modulated transmitter unit for jamming, a receiver unit for the reception of externally generated signals and a mixer preceding the receiver unit, the one input of the mixer being connected to a receiver antenna circuit and the second input to the output circuit of the transmitter unit, the carrier of which is frequency modulated according to an arbitrary function of time, said receiver unit is tuned to receive a frequency including side bands which lies within one range of beat frequencies produced by the mixer, varying in dependence of the transmitter unit modulation wave, an indicating device indicating the presence of output signals of the receiver unit in dependence of carrier frequencies received which lie within essentially the range of frequencies transmitted by the transmitter unit, said receiver unit including a first and second receiver tuned to different frequencies the inputs of the receivers are fed by the mixer in parallel the output of the receivers each are connected to the one input of a first and a second AND circuit via a first and a second time delay circuit respectively involving a time delay equal to the time interval between two successive output pulses delivered in turn by the two receivers in dependence of one received signal, the second input of the said first AND circuit is connected to the output of the said second receiver and the second input of the said second AND circuit is connected to the output of the said first receiver.

* * * * *